United States Patent [19]

Nelson et al.

[11] Patent Number: 4,729,066

[45] Date of Patent: Mar. 1, 1988

[54] METHOD AND APPARATUS FOR THE GENERATION AND TRANSMISSION OF SIGNALS FOR ECHO LOCATION AND OTHER SIGNALING PURPOSES, PARTICULARLY IN GEOPHYSICAL EXPLORATION

[75] Inventors: David E. Nelson; David M. Berg, both of Rochester, N.Y.

[73] Assignee: Hydroacoustics Inc., Rochester, N.Y.

[21] Appl. No.: 685,816

[22] Filed: Dec. 24, 1984

[51] Int. Cl.$^4$ ............................................. G01V 1/38
[52] U.S. Cl. .................................... 367/23; 367/39; 367/41; 375/22; 370/8
[58] Field of Search ............... 367/14, 231, 39, 41, 367/42; 181/114, 119, 120; 375/22, 23, 60; 332/9 R; 370/8

[56] References Cited

U.S. PATENT DOCUMENTS

| 4,070,550 | 1/1978 | Miller et al. | 370/11 |
| 4,207,962 | 6/1980 | Bauyoucos | 367/189 |
| 4,257,108 | 3/1981 | Igel | 375/22 |
| 4,295,213 | 10/1981 | Mifsud | 367/23 |

OTHER PUBLICATIONS

A. Okazaki, "Pulse Duration Modulation Applicable To Narrow Band Transmission", 1/78, J. Inst. Telv. Eng. Jpn., vol. 32, #1, pp. 33-39, Abst. Only Provided.
Cunningham, A., "Some Alternate Vibrator Signals", 12/79, Geophysics, vol. 44, #12, pp. 1901-1914.

Primary Examiner—Nelson Moskowitz
Attorney, Agent, or Firm—Martin Lukacher

[57] ABSTRACT

A transmission which requires only a single source to transmit is generated in accordance with a code which is binary (a pulse train having two levels which produces a specific harmonic line spectrum). The pulses are generated by pulse time modulation of the position and duration of pulses in a sweep which extends to the upper end of the spectrum.

22 Claims, 5 Drawing Figures

METHOD AND APPARATUS FOR THE GENERATION AND TRANSMISSION OF SIGNALS FOR ECHO LOCATION AND OTHER SIGNALING PURPOSES, PARTICULARLY IN GEOPHYSICAL EXPLORATION

The present invention relates to methods and apparatus for generating and transmitting signals in accordance with a predetermined format or code so as to provide a transmission having a defined power spectrum extending over a broad frequency range useful for echo location and other signaling purposes.

The invention is especially adapted for use in the generation of seismic signals for use in geophysical exploration and enables such signals to be transmitted in the form of binary (two-level) pulses by means of a single seismic signal source, either in marine environments or on land.

The present invention is an improvement in the Multipulse method and apparatus of seismic signaling which is described in the following: U.S. Pat. Nos. 4,147,228, issued Apr. 3, 1979 to J. V. Bouyoucos; 4,188,610, issued Feb. 12, 1980 to David E. Nelson; 4,204,278, issued May 20, 1980 to David E. Nelson; and 4,207,962, issued June 17, 1980 to J. V. Bouyoucos. In Nelson U.S. Pat. Nos. 4,188,610 and 4,204,278 it is shown that a transmission of pulse signals which sweep over a fundamental frequency range produces a harmonic spectrum which extends over a broader frequency range including harmonics of the fundamental sweep. By adjusting the amplitude and timing of the pulses, the lines of the harmonic spectrum can be shaped so as to provide a power spectrum of such shape as to be especially suitable for echo location purposes as in geophysical exploration in which seismograms are constructed by cross correlation of the transmitted signals when they are received from the geological reflection surfaces. In particular, if each octave harmonic line (lines at frequencies related by 2N where N is an integer) have relative amplitudes the square root of 2 times that of its preceeding octave harmonic line, and the sweep rate is constant, the transmission has a constant or flat power spectrum. Each of the signals is transmitted by a separate source. This source may be a separate transducer, such as the hydraulically operated bi-level sources described in Bouyoucos U.S. Pat. No. 4,207,962, unless a special seismic source capable of transmitting seismic signals having several levels, also as described in Bouyoucos U.S. Pat. No. 4,207,962, is used.

It is desirable to provide a transmission from a single source which generates a harmonic line spectrum of desired shape, for example, flat or even tilted at a certain number of decibels per octave so as to accommodate the filtering effect presented by earth formations, of pulse signals having only two levels (binary), either on and off, or tensile and compressive, as is the case with the bi-level sources described in Bouyoucos U.S. Pat. No. 4,207,962. A method and apparatus have been discovered, in accordance with the invention, for generating a two-level code or format which controls the source to produce a transmission having the spectrum with the desired shape. Then, if more than one source is used, all sources can transmit the same signal and thus provide coherent signal enhancement and greater power output. The cost and complexity of a geophysical exploration system can be reduced by the use of the code provided by the invention.

Accordingly, it is a principal object of the present invention to provide a method and apparatus for the transmission of signals having only two discrete levels enabling the transmission by a single binary source, which provides a power spectrum extending over a wide frequency range which contains multiple octaves, which spectrum has a desired shape.

It is a further object of the present invention to improve Multipulse methods and apparatus for the generation of signals, especially for seismic exploration purposes.

It is a still further object of the present invention to provide improved methods and apparatus for generating signals which sweep in frequency and provide a harmonic line spectrum extending over a much wider range than the frequency range of the sweep, in accordance with a predetermined code which causes the spectrum to have a desired shape.

Briefly described, the invention provides methods and apparatus in which transmissions are provided for echo location, seismic exploration, or other signaling purposes. These transmissions may be produced by a single source of energy, and in the form of pulses which change in amplitude from a first to a second level, and which sweep in frequency. The transmissions have a spectrum extending over a frequency range greater than that of the sweep. A carrier train of pulses is generated which sweeps in frequency, preferably for an increasing frequency sweep beginning at a frequency one octave below the highest frequency of the spectrum. The carrier pulses are pulse time modulated by sweeps of modulating signals resulting in a modulated pulse train having a spectrum with regularly spaced sidebands. The amplitudes of these sidebands generally follow the value of Bessel functions, whose arguments are the modulation coefficient. For small modulation coefficients, only the first sidebands have significant amplitude, while for large modulations, increasingly many sidebands become significant. The precise magnitudes and phases of the sidebands are different depending upon the type of pulse time modulation. For example, the upper and lower sidebands due to the pulse position type of pulse time modulation are asymmetric (opposite in phase), while those due to pulse duration modulation are symmetric (in phase). (See *Reference Data For Radio Engineers*, 6th Edition, Howard W. Sams & Co., Inc., Indianapolis, Ind. USA, pages 23-16 through 23-19.) Accordingly, the spectrum is shaped, preferably by using both types of pulse time modulation simultaneously to increase the amplitude of the sidebands at the desired spectral line frequencies, while reducing the spectral line amplitudes at the frequencies which are undesired. Accordingly, by producing a sweep of pulses having two levels, the transition times of which determine the power spectrum, a transmission is generated which has desirable correlation properties. These pulses may be used to drive a single bi-level source to produce the transmission which will have the same desirable correlation properties as the transmission produced by multiple sources utilizing the codes of the above referenced Nelson U.S. Pat. Nos. 4,188,610 and 4,204,278. It may be noted that pulse time modulation is a nonlinear operation so that the theory as presented in the referenced text is only approximately true when (a) more than one modulating frequency is applied and (b) when duration and position modulation are applied simultaneously. The use of both duration and position modulation in accordance with the invention nevertheless provides a useful guide for shaping the spectrum.

The foregoing and other objects, features and advantages of the invention, as well as a presently preferred embodiment and the best mode now known for practicing the invention, will become more apparent from a reading of the following description in connection with the accompanying drawings in which.

Figure 2:
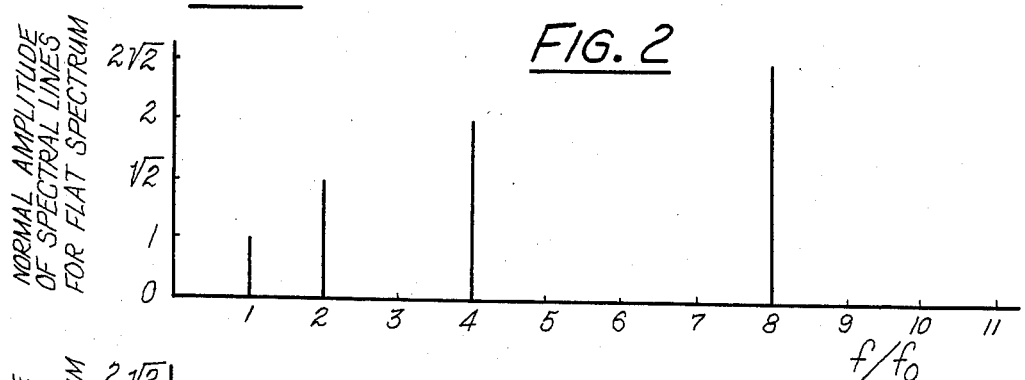
FIG. 2 is a diagram illustrating the amplitude (normalized) of the spectral lines for a flat or constant amplitude spectrum which extends over four octaves.

Referring to FIG. 2, there is shown a graph of the spectral lines produced by one period of a train of pulses which may be swept over a one octave range but have energy over a multiple octave range. The frequency scale is normalized to the fundamental $f_0$. For a four octave range in normalized terms, one to two; two to four; four to eight; and eight to sixteen, where the spectral lines for the octave frequencies, $f=2^N$, where N is an integer, are square root of 2 times the preceeding line at an octave frequency, the spectrum is of constant amplitude or flat. For a flat spectrum the spectral lines at the non-octave frequencies are of zero amplitude. Reference may be had to the above-identified patents of David E. Nelson for further information as to how the amplitudes of the spectral lines at the harmonic frequencies dictate the shape of the spectrum.

In accordance with the codes described in these Nelson patents, the spectral lines of desired amplitude are obtained through the use of pulses the durations of which are one-third of their periods; i.e., 1:3 duty cycle. Separate trains of these pulses sweep in frequency over successive octaves, and the harmonics from each source augment or subtract from each other to provide the spectral line amplitudes, such as illustrated in FIG. 2 for a flat spectrum. The ultimate transmission therefore has more than two discrete levels and requires more than a single source for the transmission thereof, unless a special source for producing a multilevel signal is used.

Figure 4:
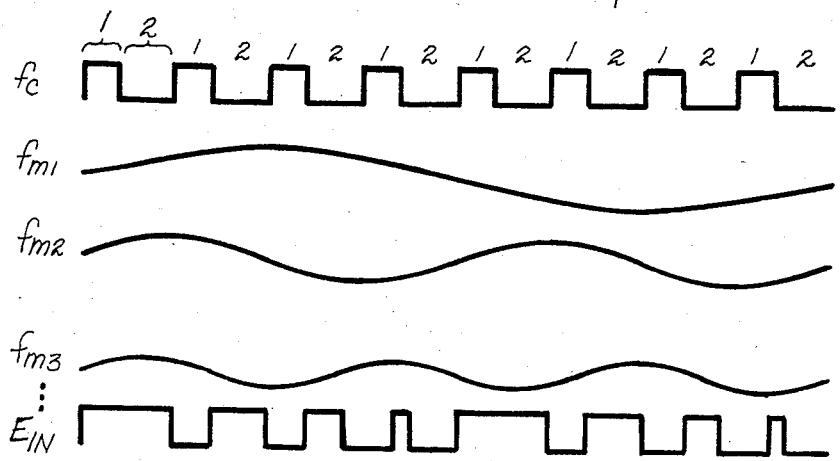
FIG. 4 are waveform diagrams of a period of the carrier pulse train and of the modulating signals which pulse time modulate the carrier pulse train to produce an output pulse train having the desired spectrum.

The present invention provides a pulse code transmission with the following properties: The waveform consists of only two discrete levels, so that it can be transmitted by a single switching seismic source, for example of the type described in Bouyoucos U.S. Pat. No. 4,207,962. The Fourier series decomposition of each code period (FIG. 4 showing a single code period by way of example, which will increase in duration over the sweep) consists of a harmonic set spanning multiple octaves. This set may be an octave harmonic set such as shown in FIG. 2. All intermediate harmonics which are not octave harmonics (viz., at normalized frequencies, $f/f_0$ equal to three, five, six, seven, nine . . . ,) are substantially attenuated.

The code period, as shown in FIG. 4 in the waveform identified as $E_{IN}$, which is the output pulse train for a spectrum covering four octaves, consists of a series of pulses of identical height. The transition times within these periods (when the pulses begin and end, or their leading and lagging edges) define the code.

It has been determined, in accordance with the invention that these transition times can be generated by pulse time modulation, and preferably by simultaneous pulse duration and pulse position modulation of a carrier pulse train, shown by the waveform labeled $f_c$ in FIG. 4. The modulated output pulse train produces a spectrum having spectral lines at the desired frequencies to produce a flat spectrum or a spectrum having another desired shape, for example, tilted so as to increase in amplitude at 6 dB per octave so as to compensate for the filtering effect of the earth. Pulse time modulation of both types (pulse duration and pulse position) is described in the above-referenced text.

Figure 3:
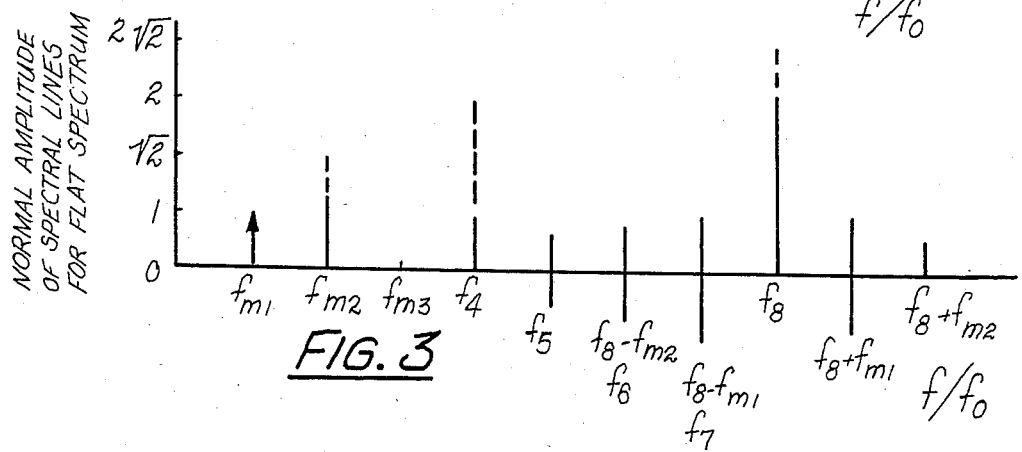
FIG. 3 is a diagram illustrating how the amplitude of sidebands at the spectral lines frequencies are augmented and decreased in amplitude so as to produce a spectrum having spectral lines of amplitude illustrated in FIG. 2, thereby obtaining a flat constant amplitude spectrum.

Referring to FIG. 3, the spectral component of the carrier pulse train at the upper end of the sweep, which is from $f_8$ to $f_{16}$ (an octave) in this example will, of course, have higher harmonics but be lacking in subharmonic components. These subharmonic components are added by pulse time modulation with the modulating signals $f_{m1}$ to $f_{m7}$. These are periodic modulating signals, preferably sinusoids as shown in FIG. 4. The modulating signals are at the subharmonics of the carrier, and $f/f_0$ equals 2, 3, 4, 5, 6 and 7. The spectrum of the modulated pulse train thus consists of the carrier and its harmonics and regularly spaced sidebands corresponding to the sum and different frequencies between the carrier harmonics and all harmonics of the modulating signals. These sidebands are shown in solid lines in FIG. 3. Arbitrary values are taken in this illustration. The amplitudes of the sidebands generally follow the value of the Bessel functions, whose arguments are the modulation coefficients. For small modulation coefficients, only the first order sidebands have significant amplitudes, for larger modulation coefficients, increasingly many sidebands become significant. The magnitudes and phases of the sidebands are different for pulse duration and pulse position modulation. To a first order the sidebands due to pulse position modulation are in opposite phase, and the sidebands due to pulse duration modulation are in phase. As noted above these phase relationships are approximate. By using both types of modulation simultaneously, the amplitude of the desirable sidebands which define the lines at the octave harmonics 1, 2, 4 and 8 can be augmented while the amplitude of the undesirable sidebands at the non-octave harmonics, 3, 5, 6, 7, 9, 10, 11, . . . can be decreased.

Figure 1:
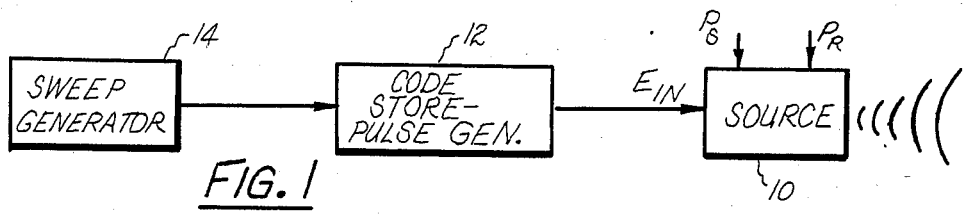
FIG. 1 is a block diagram schematically showing apparatus for producing transmissions of seismic signals in accordance with the invention.

The dash lines and lines at the non-octave harmonics which are of opposite polarity show, in FIG. 3, the result of the simultaneous pulse duration and pulse position modulation of the carrier pulse train. The resulting output signal is shown at $E_{IN}$ in FIG. 4. This signal is applied to the source 10 (FIG. 1). The source 10 may be a hydraulically operated seismic signal source such as described in the Bouyoucos, et al., U.S. Pat. No. 4,207,962, referenced above. The fundamental code period may be stored in a code store 12 such as a random access memory, or even on magnetic tape or a magnetic disc. A sweep generator 14, for example a variable frequency clock, reads out the store at an increasing rate to provide the sweep. The sweep may be an upsweep or a downsweep. The sweep rate is preferably much lower than the fundamental frequency, $f_0$.

The exact amplitudes of the amplitude and phase of the modulating signals may be determined by an iterative process. For example, for a 4 octave code, with 8 pulses used in the code period of the carrier train, the train may be pulse width modulated by sine waves at normalized frequencies, $f/f_0$ equal to 1, 2 and 4 with relative amplitudes 1, the square root of 2, and 2, respectively. For low modulation coefficients, the base band components (the first sidebands of the D.C. component of the spectrum at zero frequency) are at $f/f_0$ equals 1, 2 and 4. These spectral components then have the desirable relative amplitude. However, the carrier, which is also included in this octave harmonic set, will have relatively much too great an amplitude. The modulation coefficient (the amplitude of the modulating signals) is then increased to cause more power to shift from the carrier to the lower octave harmonics. The nonlinearity of the modulation process causes the relative amplitudes of the desired harmonics to change, and undesirable harmonics to appear. Since the entire system is subharmonically related to the carrier frequency, these higher order components appear identical to intermodulation products. A new modulating signal is now added; for example, at the third harmonic frequency, $f_{m3}$. The amplitude and the phase of the new signal is selected to cancel undesirable harmonic components and adjust the amplitude of the desired components. For example, if the initial duration modulation has resulted in some significant power in the sixth harmonic, which is an undesirable non-octave harmonic when a flat spectrum is sought, a duration modulating signal at the sixth harmonic frequency is used to create a new base band sixth harmonic component of the same magnitude and opposite phase to cancel the undesirable component at the sixth harmonic.

As new modulating signals are added to correct some harmonic component amplitude, the new modulated pulse train may be Fourier transformed to determine the effects of this change. The next modulating signal is then chosen to correct any undesirable components. Each time the output modulated pulse train may be Fourier transformed to determine the effects of the change. The process converges to obtain a pulse train with spectral energy density due to unwanted harmonic components reduced so as to provide a workable pulse code useful for seismic exploration purposes.

Using an initial one-third/two-thirds pulse train (each pulse waveform having a duty factor such that it is high one-third of a pulse period and low two-thirds of a pulse period, as shown in waveform labeled $f_c$ of FIG. 4), a pulse time modulated code, having positive transitions in its fundamental code period at relative times in electrical degrees with one fundamental period containing 360 degrees in accordance with Table I, provides a spectrum which increases linearly in amplitude at 6 dB per octave over a frequency band from 20 to 160 Hz.

TABLE I

| | Starting Time (degrees) | Duration (degrees) |
| --- | --- | --- |
| First Pulse | 0.0 | 44.64 |
| Second Pulse | 99.4 | 21.30 |
| Third Pulse | 185.1 | 34.4 |
| Fourth Pulse | 284.7 | 20.50 |

(360 degrees = 1 period for all Tables)

A pulse code for a flat or constant amplitude frequencies spectrum from 10 through 80 Hz may, for example, have the pulse transition times and durations shown in Table II.

TABLE II

| | Starting Time (degrees) | Duration (degrees) |
| --- | --- | --- |
| First Pulse | 0.0 | 64.25 |
| Second Pulse | 109.6 | 14.2 |
| Third Pulse | 198.5 | 27.2 |
| Fourth Pulse | 300.4 | 14.2 |

A pulse code for a flat or constant spectrum from 5 Hz through 160 Hz may, for example, have the pulse transition times shown in Table III.

TABLE III

| Pulse # | Starting Time (degrees) | Duration (degrees) |
| --- | --- | --- |
| 1st | 0.0 | 7.4 |
| 2nd | 27.8 | 8.6 |
| 3rd | 43.3 | 15.7 |
| 4th | 66.9 | 17.5 |
| 5th | 87.0 | 14.4 |
| 6th | 113.8 | 15.7 |
| 7th | 130.1 | 19.9 |
| 8th | 155.8 | 17.5 |
| 9th | 178.1 | 11.3 |
| 10th | 205.7 | 12.5 |
| 11th | 221.4 | 18.9 |
| 12th | 245.5 | 19.4 |
| 13th | 266.4 | 14.9 |
| 14th | 293.9 | 14.7 |
| 15th | 311.0 | 17.5 |
| 16th | 337.3 | 4.0 |

While a pulse time modulated pulse code may provide a spectrum over multiple octaves as illustrated in the foregoing example, a two octave, two pulse code (in each code period) can be generated using only pulse duration modulation (without pulse position modulation). A non-octave harmonic set may also be generated, for example, where the harmonic components are at frequencies differing by a factor of three (e.g., $f/f_0$ equal to 1, 3, 9 . . .). Although it is most desirable to generate the entire code with a single seismic source, several sources may be used to transmit subcodes, or the frequency range of the spectrum may be increased with each source covering a successive portion of an extended frequency range.

It should be understood that the pulse codes of the foregoing examples and others which may be generated will not be a perfect solution for any desired set of harmonic components. This is because the modulation process is highly nonlinear, especially at high modulation coefficients. However, in the case of the codes given in the above examples, the spectral energy due to unwanted harmonics is 15 dB or better below the desired harmonics.

Figure 5:
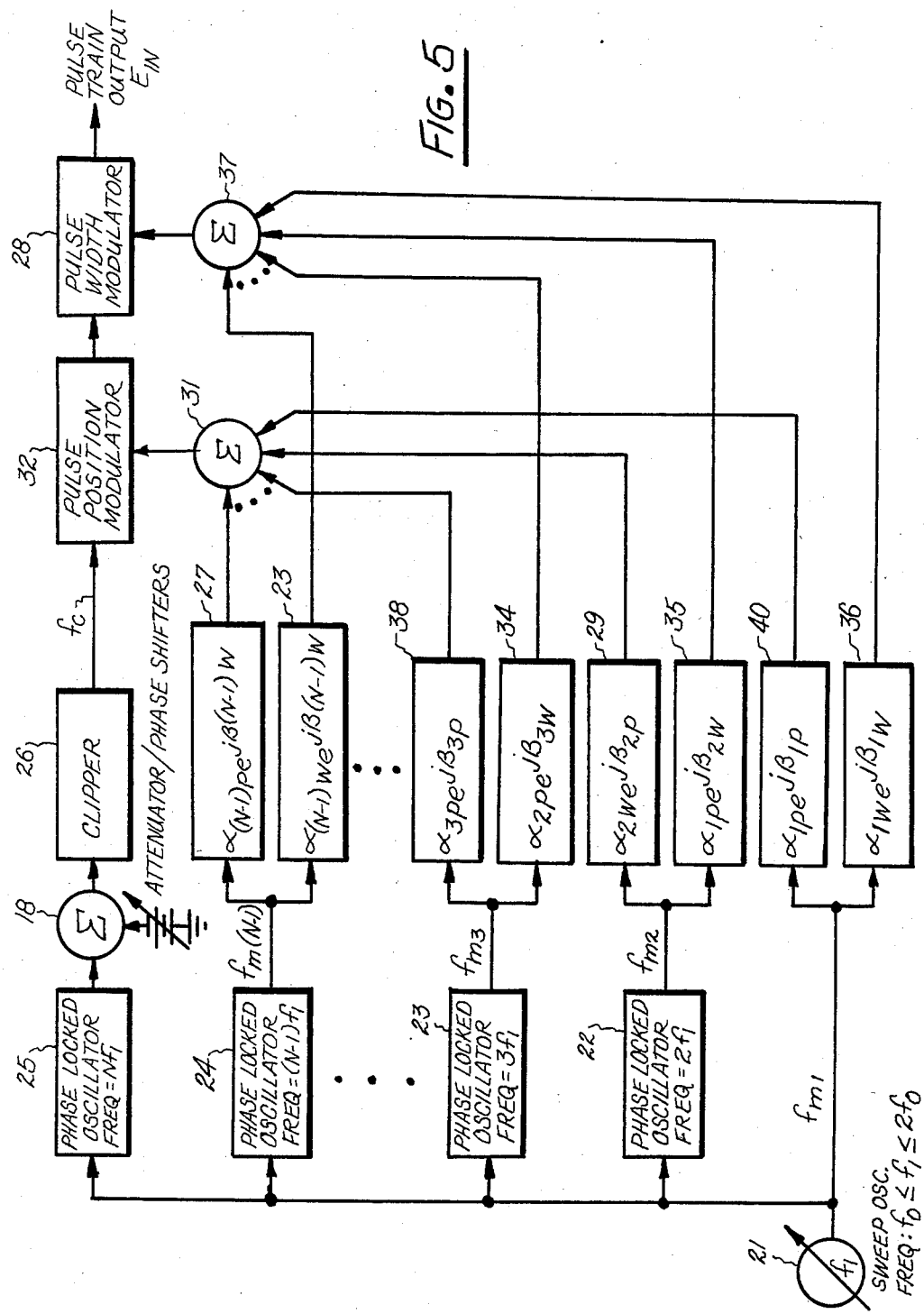
FIG. 5 is a block diagram schematically illustrating a system in accordance with the invention for generating a pulse time modulated output pulse train.

Referring to FIG. 5, there is shown a system which may be implemented with analog components to generate an output pulse train which is pulse time modulated and provides the desired code. This pulse train can be used as $E_{IN}$ directly to drive a source (such as the source 10 illustrated in FIG. 1). FIG. 5 shows the flow of the signals and provides a flow chart in accordance with which a digital computer may be programmed to produce the output pulse train. Of course, once the pulse train is defined for its fundamental code period it may be repeated over compressed pulse periods to provide a sweep covering the full spectral range.

In FIG. 5 a sweep oscillator 21 is used. It may be a sinusoidal oscillator whose frequency is, for a flat spectrum, swept linearly from $f_0$ to $2f_0$; $f_0$ being the fundamental frequency. The sweep rate is lower than the fundamental frequency, $f_0$.

Phase locked oscillators 22, 23 and 24 produce successive harmonic frequencies in phase lock relationship to the signals from the sweep oscillator 21. These frequencies are indicated as $2f_1, 3f_1 \ldots (N-1)f_1$. The sweep oscillator produces the fundamental modulating signal $f_{m1}$ which is applied to the other phase locked oscillators 22, 23, 24 and 25 produce sinusoidal modulating signals at the harmonically related frequencies. These are the modulating signals $f_{m2}, f_{m3}$ through $f_{m(N-1)}$. The carrier pulse train is produced by another phase locked oscillator 25 of frequency $Nf_1$. This oscillator 25 is a sinusoidal oscillator which is locked to the fundamental sweep oscillator 21. The frequency produced by the oscillator 25 is at the high end of the spectrum. It starts at the highest harmonic generated. This highest harmonic is swept over an octave to a frequency $2Nf_0$, which is the uppermost frequency in the spectrum. In the illustrated system the harmonic components 1, 2, 4, . . . N are generated, where N equals $2^m$, where m is an integer. Where m is 3, n is 8 and the spectrum is a flat spectrum provided with harmonic components or spectral lines as shown in FIG. 2. Then there are seven phase locked oscillators, only four of which—22, 23, 24 and 25—are shown in FIG. 5.

The waveform from the oscillator 25 is passed through a summing circuit which is biased using a D.C. voltage source, illustrated as a battery 19, so as to raise the base line of the sinusoidal waveform from the oscillator 25, when the DC voltage is combined with the sine waveform in a summing circuit 18. A clipper 26 converts the sine wave into an asymmetrical $\frac{1}{3}:\frac{2}{3}$ pulse train; for example, as shown in FIG. 4 in the waveform labeled $f_c$. This pulse train is passed successively through a pulse position modulator 32 and a pulse with modulator 28 to provide the output pulse train $E_{IN}$.

The outputs of the sweep oscillator 21 and the phase locked oscillators 22, 23 and 24 are passed through pairs of attenuator-phase shifters 36,40; 35,29; 34,38; and 33,27, which develop modulation signals for the pulse position modulator 32 and the pulse width (duration) modulator 28. One of the attenuators in each pair is connected to a summing circuit 31 and provides the composite modulating signal to the pulse position modulator 32. Similarly, a summing circuit 37 provides the composite modulating signal from the others of each pair of attenuator-phase shifter circuits to the pulse width modulator 28. The modulating signals control the amplitude in accordance with their modulating coefficients $\alpha_\omega$ and $\alpha_p$. The phase shifts are determined by the complex term, where the phase angles are represented by $\beta_\omega$ and $\beta_p$.

In operation, the coefficients $\alpha$ are increased to non-zero values and begin to produce the desired harmonic structure from the pulse train. Unwanted harmonic components have their $\alpha$ coefficients set to zero. The desired coefficients are increased gradually, and the spectrum is observed to determine how nearly the desired spectral lines (harmonic components) are coming to the desired values, and what intermodulation components are arising because of the nonlinear modulation process. When it is observed that a spectral component at a desired frequency is producing an unwanted spectral component at another frequency, then the combination of pulse position and pulse width modulation is employed to eliminate the unwanted component. The proper choice of coefficients $\alpha_p$ and $\alpha_W$ enhances one sideband and eliminates the other. This is because, as noted above, pulse position modulation produces sidebands which are opposite in phase, while pulse duration modulation produces sidebands that are in phase.

When undesired intermodulation components appear, they will be at frequencies other than the first order sum and difference frequencies of the modulating signals and the carrier; that is, at subharmonic frequencies representing higher order sums and differences. When this occurs, the modulating signal which has initially been set to zero amplitude is increased (the coefficient $\alpha$ in its attenuator/phase-shifters is changed). Also the phase coefficient $\beta$ is adjusted in order to cancel the unwanted intermodulation component. If an unwanted sum or difference frequency of the correction signal appears, it is reduced in amplitude by combining pulse position and pulse duration modulation for the particular frequency. An iterative Process is used, continuing until the desired spectral line structure is observed. An optimal, even though not exact, spectrum is obtained with the pulse code produced by the system.

The pulses and their positions may also be obtained by computer driven optimization, using a metric vector to determine the relative values of the harmonics. The computer may be programmed using linear matrix methods to provide for linear approximations and correction of the values.

When using either manual or computer driven optimization, the alphas and the betas are changed, in particular, when they are increased, the modulation can become so great as to cause one pulse to run into another, or a specific pulse to "disappear"—that is, its width goes to zero or less. Obviously, neither state is permissible for a two-level code. In the former case, the overlapping pulses would have to add to a value twice the height of the two-level code, and in the latter, the negative pulse would have to have a negative value. Accordingly, the computer program has safeguards such that whenever either of these conditions is violated, the procedure is interrupted and the operator alerted that he is demanding an impossible condition, and must choose other alphas or betas. Conversely, a solution where one pulse just touches another, or a particular pulse just disappears is a valid solution, and can be quite desirable, for it reduces the pulse count by one, making the code easier to transmit while still producing a desirable spectrum. Consequently, the operator does consciously stay alert for such opportunities, and uses them when possible.

From the foregoing description, it will be apparent that there have been provided an improved method and apparatus for generating transmissions of signals having desired spectral characteristics, and particularly a spectrum of desired shape which can extend over a multiple octave frequency range. Variations and modifications in the herein described method and apparatus, within the scope of the invention, will undoubtedly suggest themselves to those skilled in the art. Accordingly, the foregoing description should be taken as illustrative and not in a limiting sense.

We claim:

1. The method, for echo location, seismic exploration and seismic signalling, in which transmissions from a single source of seismic energy are in the form of pulses which change in amplitude from a first to a second level and which sweep in frequency, which transmissions have a spectrum extending over a frequency range greater than that of said sweep, which method comprises the steps of generating a carrier train of pulses having spectral components which sweep in frequency over a range ending at a frequency at least as high as the highest frequency in said spectrum, and pulse time modulating said carrier pulses to shape said spectrum.

2. The method according to claim 1 wherein said pulse time modulation step includes both the pulse position and pulse duration modulation of said carrier pulses.

3. The method according to claim 2 wherein said pulse position and pulse duration modulation of said carrier pulses are carried out simultaneously.

4. The method according to claim 1 wherein said pulse time modulation step comprises the steps of generating a plurality of sweeps of periodic signals at different subharmonics of said carrier pulse sweep, and pulse time modulating said carrier pulses with said signals.

5. The method according to claim 4 wherein said signals include signals which sweep over a fundamental frequency range including the frequency at the low end of said spectrum.

6. The method according to claim 5 wherein said generating step includes the step of locking said signals in phase with said signals at said fundamental, and further comprising the step of varying the amplitude and phase of said signals so as to adjust the spectral lines of said spectrum whereby to shape said spectrum.

7. The method according to claim 6 wherein said signals are sinusoidal in waveform.

8. The method according to claim 6 wherein said generating step further comprises the step of providing pairs of each of said subharmonically related signals and separately pulse position modulating and pulse time modulating said carrier pulses with different ones of each of said pairs, and separately varying the phase and amplitude of each signal of each of said pairs to shape said spectrum.

9. The method according to claim 8 wherein said varying step is carried out such that the relative amplitude of the fundamental, first, second, fourth and higher octave harmonic spectral lines of said spectrum are in predetermined ratios.

10. The method according to claim 9 wherein said ratios are the square root of two times that of the preceding octave harmonics or $1, \sqrt{2}, 2, 2\sqrt{2}, \ldots$, or any series defined by $$\sum_{n=0}^{N} 2^{(kn)},$$

where k is any constant, and N is one less than the number of octaves swept.

11. The method according to claim 9 wherein the sweep frequency range of each of said signals and said carrier pulse train is one octave.

12. The method according to claim 2 wherein said pulse time modulation is carried out to omit or merge successive pulses in said train.

13. The method according to claim 2 wherein the coefficients of said modulation are obtained by computer driven optimization.

14. A system for seismic exploration and other signalling purposes comprising a source of seismic energy operative to produce transmissions of pulse time modulated pulses generated in accordance with the method of any of claims 1 through 13.

15. The method of generating a pulse code transmission which comprises generating a train of pulses which provide a harmonic line spectrum with N harmonics and applying simultaneous pulse width and pulse position modulation to said pulses to control the amplitude and phase of said harmonics.

16. The method, according to claim 15, wherein said modulation is applied to set certain of said harmonics to zero amplitude.

17. The method, according to claim 16, wherein only harmonics of number $2^m$ have values other than zero, where $m = 0, 1, 2, 3 \ldots M$ and $N = 2^M$.

18. The method, according to claim 15, comprising the step of repeating said pulses continuously at a frequency F.

19. The method, according to claim 18, further comprising sweeping the frequency of said pulses over a frequency range.

20. The method, according to claim 17, wherein said modulating step is applied to provide only harmonics of number $2^m$ have values other than zero, wherein $m = 0, 1, 2, 3 \ldots M$, and $N = 2^M$, and the frequency sweeping step is carried out so that F is either swept upward to 2F or downward to F/2.

21. The method, according to claim 20, wherein the modulating step is carried out so that the said harmonics are in ratios $2^{m/2}$ whereby to provide a continuous constant amplitude spectrum when said frequency is swept linearly over said range.

22. The method, according to claim 20, wherein said modulating step is carried out so that said harmonics are in amplitude ratios $X^{m/2}$ where X is greater than zero, and said sweeping step is carried out so that said frequency is swept non-linearly whereby to provide a continuously spectrum sloped in amplitude.

* * * * *